March 4, 1930.  G. C. CARHART  1,749,315
TORQUE CUSHIONING MECHANISM
Filed Feb. 26, 1924  2 Sheets-Sheet 2
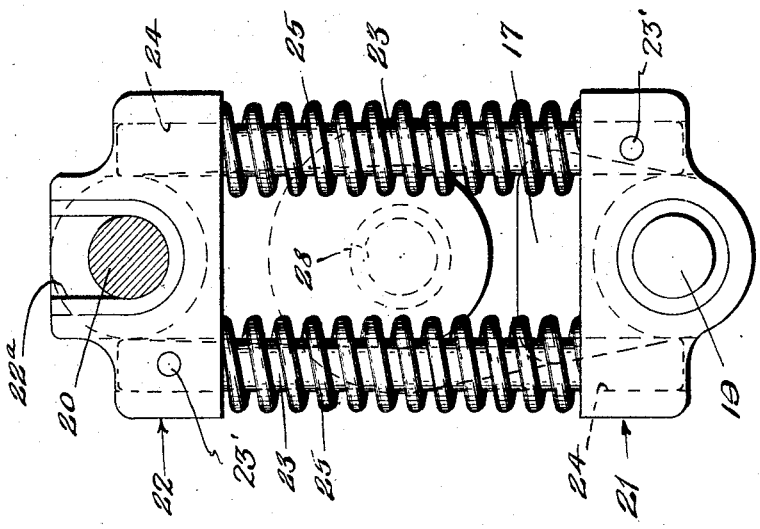
Fig-3-
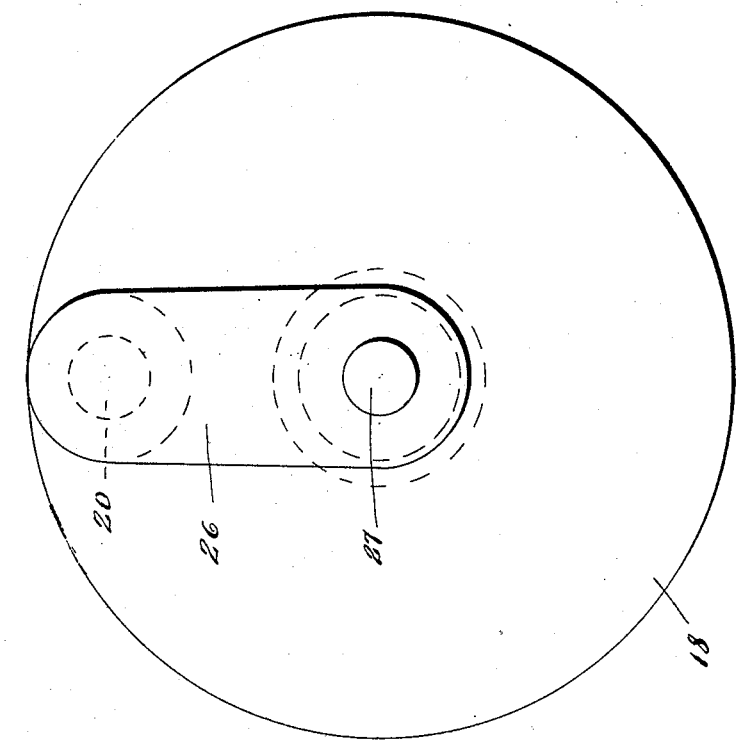
Fig-2-
INVENTOR.
George C. Carhart.
BY Parsons & Bodell
ATTORNEYS.

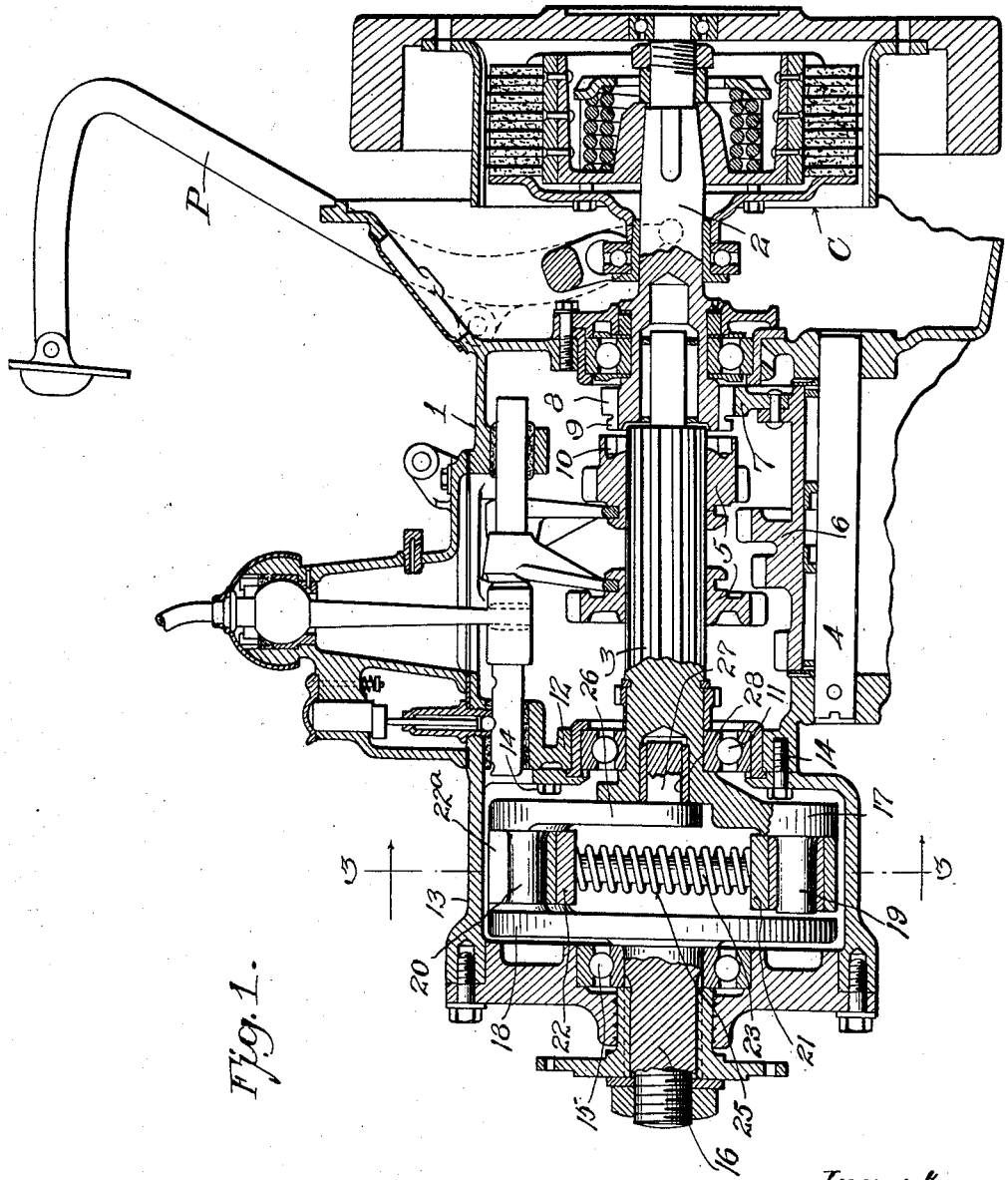

Patented Mar. 4, 1930

1,749,315

UNITED STATES PATENT OFFICE

GEORGE C. CARHART, OF SYRACUSE, NEW YORK, ASSIGNOR TO THE BROWN-LIPE GEAR COMPANY, OF SYRACUSE, NEW YORK, A CORPORATION OF NEW YORK

TORQUE CUSHIONING MECHANISM

Application filed February 26, 1924. Serial No. 695,359.

This invention relates to transmission mechanism and has for its object a torque cushioning means between two parts of the motion transmission mechanism, as any two shafts, which means permits yielding relative rotation of the shafts within limits, and is particularly simple, compact in construction, economical in manufacture, readily applied to transmission mechanisms and especially to transmission gearings, such as are used in motor vehicles and, which is highly efficient and durable in use.

In transmission mechanisms, such as are used in motor-vehicles, when the main or clutch is let in too suddenly or when the engine is running faster than or transmitting more power than can be received by the transmission mechanism when in gear with the traction wheels violent shocks and jars are transmitted through the transmission mechanism which throws violent strains on the keys and splines of the various shafts, particularly the splines on the driving axle shafts, connecting such axle shafts with the side gears of the differential and hence tends to loosen the mechanism at a number of points; and after continuing this practice of starting a marked looseness and lost motion effect is developed which results in a pronounced knocking when the vehicle is so started. The same effect takes place and develops when the engine is accelerated suddenly and also when the clutch is let in too suddenly after shifting gears from a high gear to a lower when the speeds of the engine and the transmission mechanism are out of synchronism, and also when the clutch is let in too suddenly after the car has been coasting with the engine running slow or stopped, so that the propeller shaft momentarily drives or cranks the engine. All of these conditions take place in the ordinary automobile motion transmitting mechanism, and looseness develops in one or more places between the engine and the rear driving wheels.

Such looseness may develop not only in the axle shafts, where they are splined to the side gears of the differential and at the outer axles of the shafts where they are connected to the driving wheels, usually by a key, but also within the transmission gearing, as in the clutches and in the gears themselves.

The object of this invention is therefore to produce a torque cushioning mechanism which is especially and easily adapted to the transmission gearing to relieve not only the gearing of shocks and jars but also the entire transmission mechanism between the engine and the traction wheels.

In describing this invention, reference is had to the accompanying drawings in which like characters designate corresponding parts in all the views.

Figure 1 is a sectional view of a clutch and a change speed transmission gearing unit embodying or having applied thereto my torque cushioning means, which means is shown in side elevation and partly in section.

Figure 2 is a face view of one of the crank members.

Figure 3 is a sectional view in the plane of line 3—3, Fig. 1, the connecting rod element being shown in full.

I have here shown my invention as applied to transmission gearings.

1 designates the main case of the transmission gearing, 2 and 3 the driving and driven shafts arranged in axial alinement in the main case, the driving shaft 2 being connected to the engine through suitable clutch mechanism C controlled by a pedal P. 4 is a countershaft. 5 and 6 designate generally change speed gears on the driven shaft 3 and countershaft 4. 7 and 8 are gears connecting the driving shaft and the countershaft. 9 and 10 designate the sections of the high speed clutch operable to directly connect the driving and driven shafts together. As the operation of a transmission gearing and the shifting of the gears and clutches thereof is well known, further description is thought to be unnecessary.

The driven shaft 3 is journalled in a suitable bearing 11 in one end wall, as the rear end wall 12 of the case 1, the shaft projecting beyond the rear wall of the case.

As here shown, the torque cushioning device is mounted in a casing which is mountable on or applicable to the main case transmission case 1. 13 designates the casing for the torque cushioning means, it being connected to the wall 12 of the main case in any suitable manner as by screws 14. 15 is a bearing formed in the case 13 in line with the bearing 11, and 16 is a shaft journaled in the bearing 15 and extending into the case 13, the shaft having its outer end provided with any suitable means for connection to the propeller shaft of a motor vehicle or to a universal joint between the shaft 16 and the propeller shaft. The end wall in which the bearing 15 is supported is usually detachable from the body of the case 13.

The shafts 3 and 16 are provided with coacting means between the bearings 11 and 15 by which the projecting ends of the shafts are supported intermediate such bearings and such intermediate supporting or connecting means is embodied in the torque cushioning device. Hence, the motion transmitting parts, embodying the shafts 3 and 16 and the torque cushioning means have a bearing embodied therein arranged so that each part supports the other between the main bearings for such parts.

This torque cushioning device comprises generally crank members mounted on and rotatable with shafts arranged in substantially axial alinement, eccentric pins carried by the crank members and a connecting rod element between the pins, said element being constructed to yieldingly shorten upon relative rotation of the shafts.

17 and 18 designate respectively the crank members, one of which, as the member 18, is shown as in the form of a disk, although these crank members may be of any suitable form, in order to bring about the proper balance. 19 and 20 are respectively the eccentric pins mounted on the crank elements 17 and 18, these pins being usually fixed to the crank members 17 and 18 and arranged diametrically opposite each other.

The connecting rod element comprises sections having a telescoping engagement with each other, such sections being mounted respectively on the pins 19, 20 to have a rocking action about the axis of the pins and spring means interposed between the sections.

As here illustrated, these sections include heads 21 and 22 pivotally mounted on the pins 19 and 20 respectively and each having a rod 23 extending therefrom slidable in a passage 24 in the other head, these rods being located on opposite sides of a diametral line extending through the axes of the crank pins 19, 20.

As here shown, there is a plurality of springs interposed between the heads 21, 22 and these springs are preferably compression springs and are located on opposite sides of a diametral line passing through the axes of the crank pins 19, 20. 25 designates the springs. Usually, these springs encircle the rods 23. The head 22 is usually formed with an open bearing or notch 22ª for receiving the pins 20. The heads or the eccentric pins constitute opposing spring abutments on alined shafts held from axial movement, which abutments are arranged eccentric to the common axis of the shaft. The bearings for said shafts and the walls of the casing hold the shafts from axial movement. Each rod 23 is pivoted at one end to the member 21 or 22 as at 23'. The rod has a pivotal movement during the sliding of the rod in the passage 24 of the other head.

The means for supporting the shafts 3 and 16 between their bearings 11 and 15 or the means by which one shaft, as the shaft 16, has a bearing in the other shaft, as 3, comprises a link or arm 26 mounted on the crank pin 20 outside the head 22 and also pivotally supported by the shaft 3 coaxially with said shaft, this arm 26 being here shown as having an axle or trunnion 27 arranged in a socket, or recess 28 in the end of the shaft 3 or in a bushing in said recess. The arm 26 is preferably formed integral with or fixed on the pin 20 and is interposed between the end face of the hub of the crank member 17 and the head 22, which abuts against the crank member 18, so that the space between the crank members is practically entirely filled up. Also, the crank pin 19 terminates near the crank member 18 and the head 21 of the connecting rod mounted on the pin 19 is interposed between the crank member 18 and the crank member 17, so that when the parts are assembled, they constitute a solid compact formation. The looseness may develop between the outer ends of the axle shafts and the driving wheels, the inner ends of the axles and the side gears of the differential gearing mounted thereon or within the transmisison gearing between the clutch sections and between the gears.

In operation, upon rotation of either the shaft 3 or 16 relative to the other, the springs 25 will be compressed and yieldingly resist such relative movement and thus prevent or absorb any violent shocks being transmitted through the entire transmission mechanism between the engine and the traction wheels.

This torque device is particularly advantageous in that it is simple, compact and solid in construction, consists of but few parts and is readily applicable to the transmission gearing of motor vehicles.

What I claim is:

1. The combination of shafts, a torque cushioning mechanism connecting the shafts comprising opposing crank members mounted on the shafts, an eccentric pin carried by each crank member, the pins of said crank members being normally carried substantially diametrically opposite each other and a yielding connecting rod element between said eccentric pins, said element being arranged to yieldingly shorten upon relative movement of the shafts carrying the pins out of diametrically opposite relation.

2. The combination of shafts arranged substantially in axial alinement, opposing crank members mounted on the shafts, eccentric pins carried by the crank members, the crank members being normally arranged so that the eccentric pins are normally diametrically opposite each other, and a connecting rod element between the eccentric pins comprising compressible springs normally arranged on opposite sides of a diametral line extending through the axes of such pins.

3. The combination of shafts arranged substantially in axial alinement, opposing crank members mounted on the shafts, eccentric pins carried by the crank members, the crank members being normally arranged so that the eccentric pins are normally diametrically opposite each other, heads mounted to rock about the axes of said pins and compressible spring means arranged between the heads.

4. The combination of shafts arranged substantially in axial alinement, crank members mounted on the shafts, eccentric pins carried by the crank members, the crank members being normally arranged so that the eccentric pins are normally diametrically opposite each other, and a connecting rod element between said pins comprising heads carried by said pins respectively and arranged to rock about the axes of the pins and compression springs interposed between the heads and normally arranged on opposite sides of a diametral line passing through the axes of the pins.

5. The combination of shafts arranged substantially in axial alinement, crank members mounted on the shafts, eccentric pins carried by the crank members, the crank members being normally arranged so that the eccentric pins are normally diametrically opposite each other, and a connecting rod element between said pins comprising heads mounted on the pins to rock about the axes thereof, guiding means extending from one of the heads and slidably engaging the other and compression spring means interposed between the heads.

6. The combination of shafts arranged substantially in axial alinement, crank members mounted on the shafts, eccentric pins carried by the crank members, the crank members being normally arranged so that the eccentric pins are normally diametrically opposite each other, and a connecting rod element between said pins comprising heads mounted on the pins to rock about the axes thereof, guiding means extending from one of the heads and slidably engaging the other and spring means interposed between the heads, said spring means encircling the guiding means.

7. The combination with shafts arranged substantially in axial alinement; of a torque cushioning mechanism interposed between the shafts and comprising opposing crank members mounted on the shafts eccentric to the longitudinal axis of the shafts at opposite sides of such axis and normally arranged substantially diametrically opposite each other, the crank members being movable with the shafts about such longitudinal axis and being movable toward and from each other relatively to the shafts in a plane at substantially right angles to such longitudinal axis, yielding means interposed between the opposing crank members and resisting their movement toward each other, and a rod connecting the crank members, one end of the rod being connected to one crank member and the other end of said rod being slidably connected to the other crank member, substantially as and for the purpose described.

8. The combination with shafts arranged substantially in axial alinement; of a torque cushioning mechanism interposed between the shafts and comprising opposing crank members mounted on the shafts eccentric to the longitudinal axis of the shafts at opposite sides of such axis, the crank members being movable with the shafts about such longitudinal axis and being movable toward and from each other relatively to the shafts in a plane at substantially right angles to such longitudinal axis, yielding means interposed between the opposing crank members and resisting their movement toward each other, and a pair of rods connecting the crank members, one end of one rod being connected to one crank member and the other end of said rod being slidably connected to the other crank member, and one end of the other rod being connected to the last-mentioned crank member and slidably connected to the other crank member, substantially as and for the purpose described.

9. The combination with shafts arranged substantially in axial alinement; of a torque cushioning mechanism interposed between the shafts and comprising opposing crank members mounted on the shafts eccentric to the longitudinal axis of the shafts at opposite sides of such axis, the crank members being movable with the shafts about such longitudinal axis and being pivotally connected intermediate their ends relatively to the shafts and being movable toward and from each other relatively to the shafts in a plane at substantially right angles to such longitudinal axis, substantially parallel coiled springs interposed between corresponding ends of the opposing crank members and arranged at opposite sides of the longitudinal axis of the shafts in a plane disposed at substantially right angles to said longitudinal axis, and a pair of rods within the springs, one end of one rod being connected to one crank member and the other end of said rod being slidably connected to the other crank member, and one end of the other rod being connected to the last-mentioned crank member and slidably connected to the other crank member, substantially as and for the purpose described.

10. The combination of shafts arranged substantially in axial alinement, crank members mounted on and rotatable with the shafts respectively and each having an eccentric pin, the crank members being normally arranged whereby the pins are located diametrically opposite each other, and a connecting rod element between the pins including sections having a telescoping engagement with each other and spring means interposed between such sections.

11. The combination of a casing having bearings in the opposing walls thereof, shafts journalled respectively in the bearings substantially in alinement, crank members mounted on the shafts, eccentric pins carried by the crank member and normally arranged diametrically opposite each other, a link rigidly mounted on one eccentric crank pin and pivotally connected to the shaft in which the member carrying the other eccentric pin is mounted, coaxially with such shaft and a yieldingly compressible connecting rod element between the pins.

12. In a transmission mechanism, the combination of a main casing, having a bearing in a wall thereof, a shaft mounted in such bearing extending outside of said wall, a second casing mounted on said wall of the main casing and having a bearing alined with the former bearing, a second shaft journalled in the second bearing, crank members mounted on the shafts within the second casing, eccentric pins carried by the crank members normally arranged diametrically opposite each other, an arm mounted on one crank pin and pivotally connected to the shaft with which the other crank pin is associated, coaxially with such shaft and a connecting rod element between the crank pins.

13. In combination with shafts arranged substantially in axial alinement; of a torque cushioning mechanism interposed between the shafts comprising crank members mounted on the shafts respectively and rotatable therewith, opposing heads carried by the crank members respectively, and located on opposite sides of the axis of the shafts, and yielding means interposed between the heads for resisting movement of the heads toward each other, the heads being pivotally mounted on the respective crank members.

14. In combination with shafts arranged substantially in axial alinement; of a torque cushioning mechanism interposed between the shafts comprising crank members mounted on the shafts respectively and rotatable therewith, opposing heads carried by the crank members respectively, and on opposite sides of the axis of the shafts, the heads being pivotally mounted on the respective crank members, and yielding means interposed between the heads acting in opposite directions on the heads in a direction at a right angle to the heads.

15. In combination with shafts arranged substantially in axial alinement; of a torque cushioning mechanism interposed between the shafts comprising crank members mounted on the shafts respectively, and rotatable therewith, opposing heads carried by the crank members respectively, and located on opposite sides of the axis of the shafts, the heads being pivotally mounted between the ends of the crank members, and yielding means interposed between the heads and thrusting against the heads on opposite sides of their pivotal axes.

16. In combination with shafts arranged substantially in axial alinement; of a torque cushioning mechanism interposed between the shafts comprising crank members mounted on the shafts respectively and rotatable therewith, opposing heads carried by the crank members respectively and located on opposite sides of the axis of the shafts, the heads being pivotally mounted on the respective crank members, and yielding means comprising coil springs interposed between the heads and thrusting against the same on opposite sides of the pivot.

17. In combination with shafts arranged substantially in axial alinement; of a torque cushioning mechanism interposed between the shafts comprising crank members mounted on the shafts respectively, and rotatable therewith, opposing heads carried by the crank members respectively, and located on opposite sides of the axis of the shafts, and yielding means interposed between the heads for resisting movement of the heads toward each other, the heads being pivotally mounted on the respective crank members, one head also having a guiding means projecting therefrom and slidably engaging the other head.

18. In combination with shafts arranged substantially in axial alinement; of a torque cushioning mechanism interposed between the shafts comprising crank members mounted on the shafts respectively, and rotatable therewith, opposing heads carried by the crank members respectively, and located on opposite sides of the axis of the shafts, the heads being pivotally mounted on the respective crank members, guide rods interposed between the heads, each rod being carried by one head and slidable endwise in the other head, and yielding means interposed between the heads.

19. In combination with shafts arranged substantially in axial alinement; of a torque cushioning mechanism interposed between the shafts comprising crank members mounted on the shafts respectively, and rotatable therewith, opposing heads carried by the crank members respectively and located on opposed sides of the axis of the shafts, the heads being pivotally mounted on the respective crank members and yielding means interposed between the heads acting in opposite direction on the heads in a direction at a right angle to the heads, the yielding means including springs coiled about a rod and thrusting against the heads.

20. The combination with rotatable elements arranged substantially in axial alinement; of a torque cushioning mechanism interposed between the elements comprising heads pivotally mounted between their ends on said elements respectively eccentric to the axis thereof and rotatable with said elements, said heads being opposed to each other and located on opposite sides of the axis of the shafts and yielding means interposed between the heads and directly abutting against the terminal portions of the same and coacting with the heads on opposite sides of the pivotal axis of the heads.

In testimony whereof, I have hereunto signed my name, at Syracuse, in the county of Onondaga, and State of New York, this 22nd day of Feb., 1924.

GEORGE C. CARHART.